(No Model.)
W. T. GARDNER.
COTTON PLANTER.
No. 296,947. Patented Apr. 15, 1884.
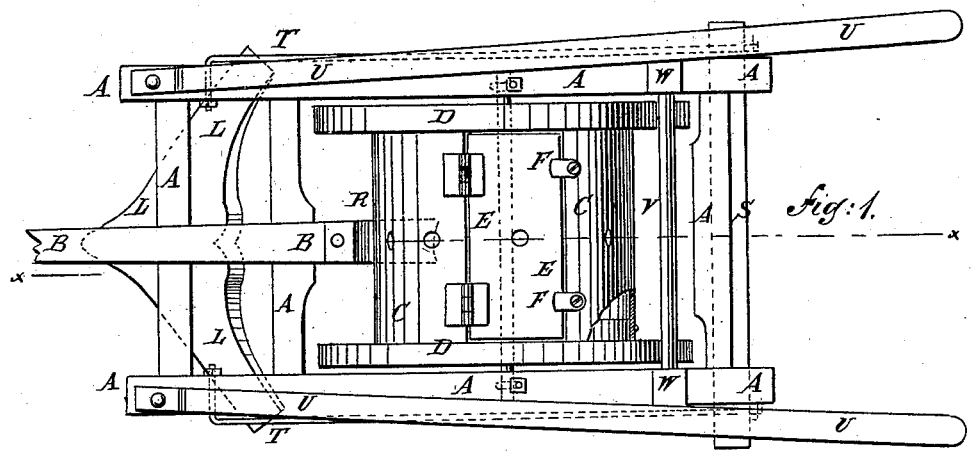
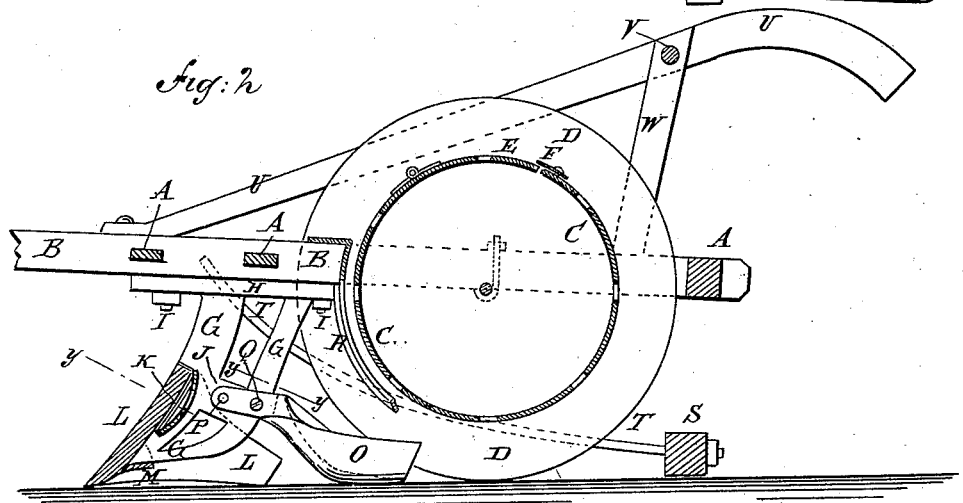
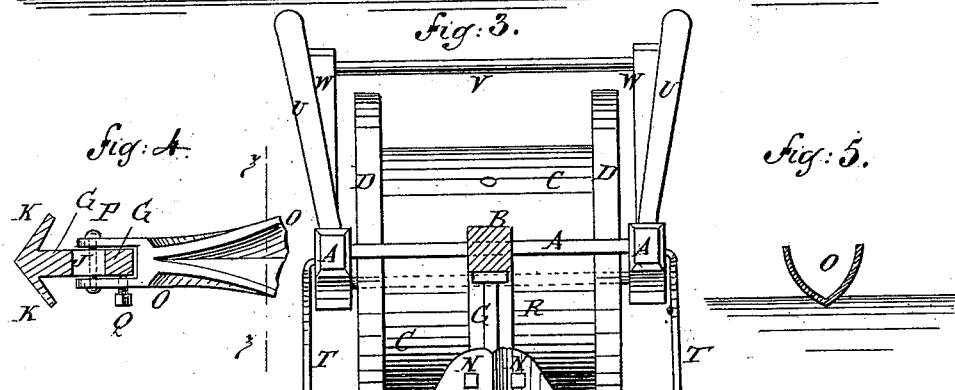
WITNESSES:
Chas. Nida
C. Sedgwick
INVENTOR:
W. T. Gardner
BY Munn & Co.
ATTORNEYS.

UNITED STATES PATENT OFFICE.

WILLIAM THOMAS GARDNER, OF TARBOROUGH, NORTH CAROLINA.

COTTON-PLANTER.

SPECIFICATION forming part of Letters Patent No. 296,947, dated April 15, 1884.

Application filed November 8, 1883. (No model.)

*To all whom it may concern:*

Be it known that I, WILLIAM THOMAS GARDNER, of Tarborough, in the county of Edgecombe and State of North Carolina, have invented a new and useful Improvement in Cotton-Planters, of which the following is a full, clear, and exact description.

Reference is to be had to the accompanying drawings, forming part of this specification, in which similar letters of reference indicate corresponding parts in all the figures.

Figure 1 is a plan view of one of my improved cotton-planters. Fig. 2 is a sectional side elevation of the same, taken through the line x x, Fig. 1. Fig. 3 is a front elevation of the same, the tongue being shown in sections. Fig. 4 is a sectional plan view of the plow-standard, taken through the line y y y, Fig. 2, and showing the forward part of the opener in plan view. Fig. 5 is a sectional end elevation of the opener, taken through the line z z, Fig. 4.

My invention relates to improvements in cotton-planters; and it consists in the peculiar construction and arrangement of the parts, as hereinafter more fully set forth, and pointed out in the claim.

A represents the frame, to the centers of the forward cross-bars of which is attached the tongue B.

C is the seed-dropping cylinder, the journals of which revolve in bearings attached to the side bars of the frame A. The cylinder C is made with annular flanges D at its ends, which serve as wheels to carry the said cylinder, and has a door, E, in one side for convenience in putting in the seed, which door is hinged at one edge, and is secured at its other edge, when closed, by buttons F or other suitable fastenings. Around the center of the cylinder C is formed an annular row of holes, through which the seed escapes as the said cylinder rolls forward.

G is the plow-standard, which is made double, the two parts being connected by a bar, H, the ends of which are perforated to receive the bolts I, that fasten the said standard to the tongue B. The lower ends of the parts of the standard G meet at an angle, and the said parts are connected a little below their centers by a web, J.

Upon the sides of the forward edge of the standard G are formed wings K, to form a seat for the plow L. The plow L is made with two wings or mold-boards, and its lower edge is slightly arched, to smooth off and give a proper shape to the top of the ridge.

Upon the rear side of the middle lower part of the plow L is formed a socket, M, to receive the pointed lower end of the standard G, and the said plow is secured in place by screws or bolts N, passing through it and into or through the wings K, so that the said plow can be readily detached when desired.

O is the opener, which is recessed upon its upper side, and is made with rounded sides meeting at an angle, as shown in Fig. 5. The forward end of the opener O is slotted to receive the standard G, and is pivoted to the said standard by a bolt, P, passing through it and through the web J.

Q is a set-screw, which passes through one arm of the slotted forward end of the opener O, and rests against the side of the rear part of the standard G, to hold the said opener securely in any position into which it may be adjusted. With this construction, by loosening the set-screw Q, the opener O can be adjusted to open a channel to any desired depth.

To a cross-bar of the frame A, or to the rear end of the tongue B, is secured, by bolts or other suitable means, the upper end of a spout, R, which is curved upon the arc of the cylinder C, and passes down along the forward side of the said cylinder C directly opposite its discharge-openings. The lower end of the spout R extends to or nearly to the rear end of the opener O, so as to guide the seed into the channel opened by the said opener. The spout R slightly spreads the seeds, so that the cotton-plants can be more readily thinned than when the seed is deposited in the ground in bunches.

The seed is covered with soil, and the top of the ridge is smoothed off by a covering-block, S, attached to the rear ends of the rods T, the forward ends of which are pivoted to the forward parts of the side bars of the frame A, so that the said covering-block can adjust itself to an irregular surface of ground. To the forward parts of the side bars of the frame A are attached the forward ends of the handles U, the rear parts of which are connected by a round, V, and are supported at the proper elevation by the uprights W, attached to them or to the round V and to the rear parts of the side bars of the frame A.

Having thus described my invention, what I claim as new, and desire to secure by Letters Patent, is—

The combination, with the plow L, provided with the socket M, and the adjustable pivoted channel-opener O, of the standard G, provided with the side wings, K, and made in two parts, united in a point at their lower ends, connected at their upper ends by the plate H, and provided at their middle parts by a web, J, substantially as shown and described.

WILLIAM THOMAS GARDNER.

Witnesses:
W. A. BRIDGERS,
B. S. TAYLOR.